Sept. 11, 1962   J. E. BARRICK ET AL   3,054,027
WINDING TERMINAL
Filed July 30, 1959

INVENTORS.
JAMES E. BARRICK
BY CLYDE M. LUCAS

Woodling and Throat,
ATTORNEYS

3,054,027
WINDING TERMINAL
James E. Barrick and Clyde M. Lucas, Alliance, Ohio, assignors to Consolidated Electronics Industries Corporation, a corporation of Delaware
Filed July 30, 1959, Ser. No. 830,531
13 Claims. (Cl. 317—158)

The invention relates in general to electric terminals for electrical windings and more particularly to a novel terminal permitting quick and easy connection to the two coil ends of an electrical winding.

Electrical coils or windings are used in many different forms of apparatus including relays, solenoids, electric motors and the like, and in many cases the electrical winding is made of relatively fine wire, for example, from No. 24 to No. 40 AWG. This relatively fine wire usually must be connected to heavier gauge wire so that the entire winding may be connected to other parts of the complete elecrical apparatus. In the past, one way to connect the fine wire of the coil to the external heavier wire was to make a twisted and soldered connection between the two, then to insulate the connection with insulating tape and then to lay the splice or connection adjacent the periphery of the coil and then wrap the periphery of the coil with insulating tape. The winding, with the heavier gauge wire attached thereto, is then ready to be connected to the complete electrical apparatus. Many times the complete electrical winding was to be used in several different apparatuses requiring different lead or conductor lengths, and this required stocking several different coils, each with the required lead lengths.

Accordingly, an object of the invention is to provide an electrical winding with electrical terminals to which the coil ends may be permanently connected, and then the terminals later used to connect to external conductors which are to be electrically connected to the two coil ends of the winding.

Another object of the invention is to provide an electrical winding with first and second relatively rigid terminals for external connection to the coil ends of the winding.

Another object of the invention is to provide an insulated terminnal for an electrical winding to which an external conductor may be connected.

Another object of the invention is to provide terminals for the coil ends of the winding, which terminals are relatively rigidly connected adjacent the preiphery of the coil to withstand forces in all directions.

Another object of the invention is to provide a terminal to engage the spool end on which a coil is wound so that the engagement between the terminal and the spool end holds the terminal relatively rigidly fixed and an external conductor of any desired length may be connected to the terminal.

Another object of the invention is to provide an electric motor with two terminals relatively rigidly fixed relative to the motor so that external conductors of any desired length may be connected to the terminals.

Other objects and a fuller understanding of this invention may be had by referring to the following description and claims, taken in conjunction with the accompanying drawing, in which:

Figure 1:
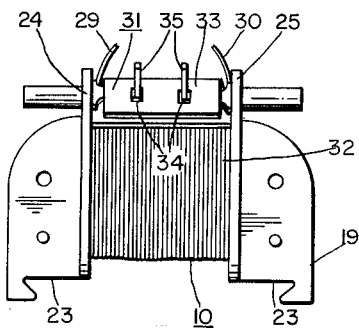
FIGURE 1 is a plan view of an electrical winding for a terminal according to the invention and shown in a preliminary stage of assembly.
Figure 2:
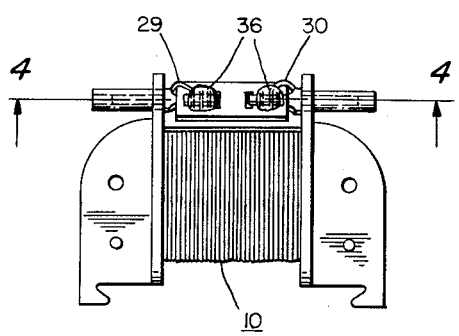
FIGURE 2 is a plan view similar to FIGURE 1, but showing the terminals in an intermediate stage of assembly.
Figure 3:
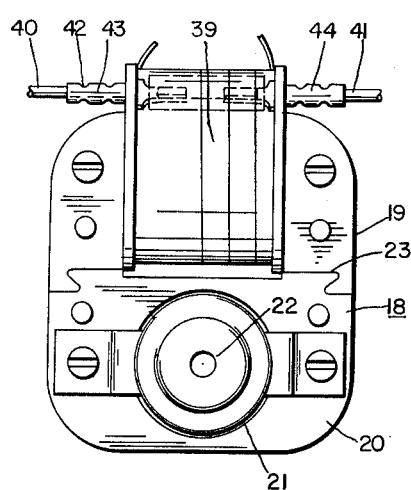
FIGURE 3 is a plan view of a motor having a winding with terminals completed according to the invention, and with external conductors.
Figure 5:
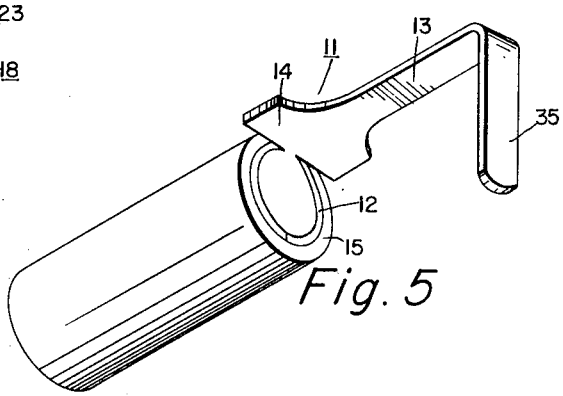
FIGURE 5 is an enlarged isometric view of the terminal.

The FIGURES 1, 2 and 3 show an electrical winding 10 having terminals according to the invention. FIGURE 5 shows one of the terminals 11 before its assembly into the complete winding 10. This terminal 11 has a substantially tubular body 12, an arm 13 and a shoulder 14 at the junction between the arm 13 and body 12. These three parts are integral and made from flexible conductive metal, for example, copper, brass or aluminum. The shoulder 14 may also be considered as a flange on the arm 13 at the junction with the body 12. This body 12 may conveniently be made by bending two opposed portions to form a split cylinder and hence, may conveniently be made from a flat metal stamping. The terminal 11 also includes an outer insulating sheath 15 which is also tubular and preferably one piece to extend over and enclose the periphery of the tubular body 12. Preferably this outer insulating sheath is longer than the tubular body 12 so as to cover both axial ends of the body 12.

Figure 4:
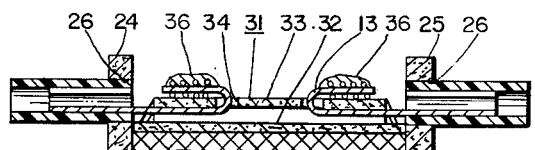
FIGURE 4 is an enlarged sectional view on line 4—4 of FIGURE 2.

The electrical winding 10 may be any electrical winding or coil and FIGURE 3 shows this electrical winding as the field winding of an electric motor 18 which has a two-part metal core 19, 20, and a rotor 21 journalled in a bearing 22. The two-part core 19, 20 is interconnected at a joint 23 and initially during assembly of the motor 18 only one core part 19 is used for the winding 10. This is as shown in FIGURES 1 and 2. The core part 19 is provided with an insulated spool or bobbin formed by insulation on the core part 19, plus first and second square insulating washers 24 and 25. These insulating washers make spool ends or bobbin ends and may be conveniently made from fiber or other relatively rigid material. Holes or apertures 26 are provided in one corner of each of the washers 24 and 25 to receive the body 12 of the terminal 11. This is better shown in FIGURE 4. The terminals 11 are inserted from the inside toward the outside of the spool so that the flange or shoulder 14 generally abuts the inner surface of the washers 24 and 25.

In FIGURE 1 the coil or winding 10 has first and second coil ends 29 and 30 which may be made from relatively small wire, for example, from No. 24 to No. 40 AWG. Such coil may be wound in any suitable manner such as in an automatic coil winding machine. The fact that the core 19, 20 is in two parts materially aids the easy winding of such coil. The two coil ends 29 and 30 may be wrapped around the joints 23 of the core at this stage to keep them out of the way for convenience.

An insulator terminal holder 31 may be made from fiber or fish paper or other thin relatively stiff insulating material, and this insulator terminal holder 31 has a length approximately equal to the axial length of the winding 10 between the spool ends 24 and 25. This terminal holder 31 may be disposed adjacent the outer peripheral surface of the winding 10, and as shown, this terminal holder 31 has a lower flap 32 and an upper flap 33. The upper flap 33 has slots 34 disposed approximately one-third the axial length from each end of the spool. FIGURE 1 shows the arms 13 bent at right angles approximately half their length, as in FIGURE 5, with the outer ends 35 of these arms extending outwardly away from the coil through the slots 34. The two flaps 32 and 33 have been shown as being in one piece and this conveniently holds the two flaps together with the lower flap 32 providing insulation between the terminals and the outer periphery of the coil 10, and with the upper flap 33 helping to locate the terminals 11.

FIGURE 2 shows an intermediate stage in the assembly of the electrical winding 10 and of the complete motor 18, and in this intermediate stage the coil ends 29 and 30 have been wrapped around the outer ends of the arms 13. The coil ends 29 and 30 may then be connected to these outer ends 35 in any suitable means, and one suitable means is to dip-solder 36 the wire ends to these terminal arms. Next the arms may be bent double so that the upper flap 33 is held by the two portions of the arm 13. This intermediate stage will then appears as in FIGURE 2. Insulating tape 39 may then be wrapped around the outer periphery of the coil 10 to cover the coil ends, the terminal arms 13 and the terminal holder 31. Next the complete motor 18 may be assembled as shown in FIGURE 3. FIGURE 3 also shows external conductors 40 and 41 inserted into the outer ends of the terminals, and with these terminals crimped or compressed at 42 through the insulating sheath to compress the tubular body 12 on the bared ends of the conductors 40 and 41. This crimping 42 provides mechanical and electrical connection to the conductors inside the insulated external conductors 40 and 41. The FIGURE 3 shows the completed terminals 43 and 44 with the external conductors 40 and 41 fastened therein. The insulating sheath 15 may be of any suitable material which will withstand the compressive force of a compression-type tool and transmit this force to the inner tubular body preferably without tearing or rupturing the sheath 15. Suitable materials for the insulating sheath may be vinylidene chloride or other vinyl compounds, or may be the material known as nylon.

The outer insulating sheath 15 fits rather closely in the holes 26 in the spool ends 24 and 25 to preclude much lateral movement of the terminals 11 relative to these spool ends. Also the insulating tape binding the periphery of the coil 10 holds the arms 13 quite tightly against the periphery of the coil 10 so that the complete assembly as shown in FIGURE 3 establishes the terminals 43 and 44 quite rigidly fixed relative to the core part 19. This practically precludes all lateral movement of the terminals 43 and 44. The fact that the arms 13 extend through the slots 34 and are bent double means that these arms 13 engage the terminal holder and hence, any axial pull on the conductors 40 or 41 will result in an axial outward force on the respective terminals 43 and 44 which is resisted by this interconnection between the terminal arm 13 and the terminal holder 31. This force is resisted because the end of the terminal holder 31 closely abuts the inner surface of the spool ends 24 and 25. Also the shoulder or flange 14 abuts the inner surface of the spool ends 24 and 25 to resist axial outward force on the terminals. Also the binding tape 39 engaging the terminal arms 13 and the terminal holder 31 assures that the entire assembly is held tightly together so that the arms 13 engage the axially inward edge of the slots 34 so that the terminals 43 and 44 are able to resist considerable axial force directed inwardly. Thus, the entire assembly as shown in FIGURE 3 maintains the terminals 43 and 44 relatively fixed in position to withstand forces in all lateral directions and in axially inward and outward directions. This is quite important because many times in manufacture and assembly the complete winding 10 or motor 18 is lifted by the external conductors 40 and 41 and actually given considerable abuse so that it is essential to have completed terminals 43 and 44 which not only make good electrical connection, but also generally strong mechanical connection. These external conductors 40 and 41 typically may be insulated stranded wires of about No. 16 to No. 20 AWG and thus, the winding terminal of the present invention provides a ready and efficient connection between the small and large sizes of wires.

The insulated washers 24 and 25 provide insulation between the terminals 11 and core 19, and accordingly, provide insulation between the two terminals 43 and 44. This insulation property is aided by the insulating sheath 15 so that in the completed assembly shown in FIGURE 3 there are no exposed electrical conductors which could present a shock hazard.

What is claimed is:

1. In combination, a core, a bobbin on said core having insulated bobbin ends, a wire coil on said bobbin and having coil ends, first and second terminals, means providing electrical connection from said coil ends to said terminals and including integral metallic arms on said terminals extending inboard of said bobbin ends, a terminal holder of insulating material disposed externally of said coil in close proximity thereto and extending between said spool ends, means interconnecting said terminal holder and said terminals, means providing electrical insulation to the periphery of said coil and to said metallic arms and including insulating tape wrapped around the periphery of said coil and covering said arms, apertures in said bobbin ends, means including said apertures embracing at least a part of said terminals and including said tape to hold said terminals relatively fixed with respect to said coil, means including said insulated bobbin ends to provide insulation between said terminals and said core, and means including said arms and said tape to withstand forces on said terminals directed substantially parallel to said core.

2. An electrical winding, comprising in combination, a spool having first and second spool ends, a coil on said spool and having first and second wire ends, an aperture in each spool end, first and second terminals each having a metallic tubular body and disposed in said apertures, a metallic arm on each said metallic body, a terminal holder of insulating material disposed externally of said coil in close proximity thereto and extending between said spool ends, means interconnecting said terminal holder and said terminals, said wire ends on said coil being connected to said metallic arms, means including insulating tape covering said coil and arms to hold said terminals relatively fixed with respect to said coil, means including a part of said terminal axially engaging each said spool end to resist outward axial force on said terminals, and means including said tape binding said arms to said coil to resist inward force on said terminals, whereby said metallic bodies provide electrical connection to the two ends of said coil and whereby external conductors may be inserted into said metallic bodies for connection thereto.

3. An electrical winding, comprising in combination, a spool, a coil on said spool and having first and second wire ends, first and second apertures in said spool, first and second terminals each having a metallic tubular body and disposed in said apertures, a relatively thin and stiff insulator terminal holder disposed externally of said coil in close proximity thereto and extending substantially from one spool end to the other, means interconnecting said terminal holder and said terminals, said wire ends on said coil being connected to said terminals, means including insulating tape covering said coil and terminal holder to hold each terminal holder and said terminals relatively fixed with respect to said coil, means including one of said terminals and said terminal holder engaging said spool to resist outward force on said terminals, and means including said interconnecting means and said tape binding said terminal holder to said coil to resist inward force on said terminals, whereby said metallic bodies provide electrical connection to the two ends of said coil and whereby external conductors may be inserted into said metallic bodies for connection thereto.

4. An electrical winding, comprising, in combination, a spool having first and second spool ends, a coil on said spool and having first and second wire ends, an aperture in each spool end, first and second terminals each having a metallic tubular body and disposed in said apertures, a metallic arm on each said metallic body, a relatively thin and stiff insulator terminal holder disposed externally of said coil in close proximity thereto and extending substantially from one spool end to the other, means interconnecting said terminal holder and said metallic arms, said wire ends on said coil being connected to said metallic arms, means including insulating tape covering said coil, terminal holder and arms to hold said terminal holder and said terminals relatively fixed with respect to said coil, means including one of said terminals and said terminal holder axially engaging each said spool end to resist outward axial force on said terminals, and means including said interconnecting means and said tape binding said terminal holder and arms to said coil to resist inward axial force on said terminals, whereby said metallic bodies provide electrical connection to the two ends of said coil and whereby external conductors may be inserted into said metallic bodies for connection thereto.

5. An electrical winding, comprising, in combination, a spool having first and second spool ends, a coil on said spool and having first and second wire ends, an aperture in each spool end, first and second terminals each having an inner metallic tubular body and an outer insulating sheath and disposed in said apertures, a metallic arm on each said metallic body, a relatively thin and stiff terminal holder disposed externally of said coil in close proximity thereto and extending from one spool end to the other, means in said terminal holder engaging said metallic arms, said wire ends on said coil being connected to said metallic arms, means including insulating tape covering said coil, terminal holder and arms to hold said terminal holder and said terminals relatively fixed with respect to said coil, and means including one of said terminals and said terminal holder axially engaging the inner surface of each said spool end to resist outward axial force on said terminals, whereby said metallic bodies provide electrical connection to the two ends of said coil and whereby external conductors may be inserted into said metallic bodies for connection thereto.

6. An electrical winding, comprising, in combination, a spool having first and second spool ends, a coil on said spool and having first and second wire ends, an aperture in each spool end, first and second terminals each having an inner metallic tubular body and an outer insulating sheath and disposed in said apertures, a metallic arm on each said metallic body, a relatively thin and stiff terminal holder disposed externally of said coil in close proximity thereto and extending from one spool end to the other, first and second slots in said terminal holder, said metallic arms passing through said slots and being bent double on themselves, said wire ends on said coil being connected to said metallic arms, means including insulating tape covering said coil, terminal holder and arms to hold said terminal holder and said terminals relatively fixed with respect to said coil, means including one of said terminals and said terminal holder axially engaging the inner surface of each said spool end to resist outward axial force on said terminals, and means including said arms engaging said slots and said tape binding said terminal holder and arms to said coil to resist inward axial force on said terminals, whereby said metallic bodies provide electrical connection to the two ends of said coil and whereby external conductors may be inserted into said metallic bodies with said insulating sheath and metallic bodies deformed onto said external conductors for mechanical electrical connection thereto.

7. An electrical winding, comprising, in combination, a frame, first and second spaced insulator spool ends on said frame, a coil on said frame between said spool ends and having a wire end, a hole in one spool end outboard of the periphery of said coil, a terminal having an inner metallic tubular body and an outer insulating sheath and disposed in said hole, a metallic arm on said metallic body, a relatively thin and stiff terminal holder disposed externally of said coil in close proximity thereto and extending from one spool end to the other, a slot in said terminal holder, said metallic arm passing through said slot and being bent double on itself, said wire end on said coil being connected to said metallic arm, insulating tape covering said coil and said terminal holder and arm and holding said terminal holder fixed relative to said coil, means including one of said terminals and said terminal holder axially engaging the inner surface of said spool end to resist outward axial force on said terminal, and means including said arm engaging said slot and said tape binding said terminal holder and arm to said coil to resist inward axial force on said terminal, whereby said metallic body provides electrical connection to one end of said coil and whereby an external conductor may be inserted into said metallic body with said insulating sheath and metallic body deformed onto said external conductor for mechanical and electrical connection thereto.

8. An electrical winding, comprising, in combination, a frame, first and second spaced insulator spool ends on said frame, a coil on said frame between said spool ends and having first and second wire ends, a hole in each spool end outboard of the periphery of said coil, first and second terminals each having an inner metallic tubular body and an outer insulating sheath and disposed in said holes, a metallic arm on each said metallic body, a relatively thin and stiff terminal holder disposed externally of said coil in close proximity thereto and extending from one spool end to the other, first and second slots in said terminal holder, said metallic arms passing through said slots and being bent double, said wire ends on said coil being connected to said metallic arms, insulating tape covering said coil and said terminal holder and arms and holding said terminal holder fixed relative to said coil, means including one of said terminals and said terminal holder axially engaging the inner surface of each said spool end to resist outward axial force on said terminals, and means including said arms engaging said slots and said tape binding said terminal holder and arms to said coil to resist inward axial force on said terminals, whereby said metallic bodies provide electrical connection to the two ends of said coil and whereby external conductors may be inserted into said metallic bodies with said insulating sheath and metallic bodies deformed onto said external conductors for mechanical and electrical connection thereto.

9. An electrical winding, comprising, in combination, a frame, first and second spaced insulator spool ends on said frame, a coil on said frame between said spool ends and having first and second wire ends, a hole in each spool end outboard of the periphery of said coil, first and second terminals each having an inner metallic tubular body and an outer insulating sheath and disposed in said holes, a metallic arm on each said metallic body, a shoulder on said terminal at the junction of said arm and body, a relatively thin and stiff terminal holder disposed externally of said coil in close proximity thereto and extending from one spool end to the other, first and second slots in said terminal holder, said metallic arms passing through said slots and being bent double, said wire ends on said coil being connected to said metallic arms, insulating tape covering said coil and said terminal holder and arms and holding said terminal holder fixed relative to said coil, means including said shoulder of each said terminal axially engaging the inner surface of each said spool end to resist outward axial force on said terminals, and means including said arms engaging said slots and said tape binding said terminal holder and arms to said coil to resist inward axial force on said terminals, whereby said metallic bodies provide electrical connection to the two ends of said coil and whereby external conductors may be inserted into said metallic bodies with said insulating sheath and metallic bodies deformed onto said external conductors for mechanical and electrical connection thereto.

10. An electrical winding, comprising, in combination, a frame, first and second spaced insulator spool ends on said frame, a coil on said frame between said spool ends and having first and second wire ends, a hole in each spool end outboard of the periphery of said coil, first and second terminals each having an inner metallic tubular body and an outer insulating sheath, a metallic arm on each said metallic body, a shoulder on said arm at the junction of said arm and said body, a relatively thin and stiff terminal holder having a length considerably exceeding the width thereof and disposed externally of said coil in close proximity thereto and with said length dimension extending from one spool end to the other, first and second slots in said terminal holder, said insulating sheaths passing through said holes in said spool ends with said shoulders disposed adjacent the inner surfaces of said insulating washers, said metallic arms passing through said slots and being bent double, said wire ends on said coil being connected to said metallic arms, and insulating tape covering said coil and said terminal holder, whereby said metallic bodies provide electrical connection to the two ends of said coil and whereby external conductors may be inserted into said metallic bodies with said insulating sheath and metallic bodies deformed onto said external conductors for mechanical and electrical connection thereto.

11. An electrical winding, comprising, in combination, a frame, first and second spaced insulator spool ends on said frame, a coil on said frame between said spool ends and having first and second wire ends, a hole in each spool end outboard of the periphery of said coil, first and second terminals each having an inner metallic tubular body and an outer insulating sheath, an integral arm on each said metallic body, an integral metallic flange on each said arm at the junction of said arm and said body, a relatively thin and stiff terminal holder having a length considerably exceeding the width thereof and disposed externally of said coil in close proximity thereto and with said length dimension extending from one spool end to the other, first and second slots in said terminal holder spaced approximately one-third the longitudinal distance from the two ends thereof, said insulating sheaths passing through said holes in said spool ends with said integral flanges disposed adjacent the inner surfaces of said insulating washers, said integral metallic arms passing through said slots and being bent double on themselves with said terminal holder therebetween, said wire ends on said coil being connected to said integral arms, and insulating tape covering said coil and said terminal holder, whereby said metallic bodies provide electrical connection to the two ends of said coil and whereby external conductors may be inserted into said metallic bodies with said insulating sheath and metallic bodies deformed onto said external conductors for mechanical and electrical connection thereto.

12. An electric winding comprising, in combination, a core, first and second spaced relatively rigid square insulator washers on said core forming spool ends, a coil on said core having a wire end and disposed between said spool ends, a hole in one corner in one of said insulator washers, a terminal having an inner metallic tubular body and an outer insulating sheath, an integral arm on said metallic body, an integral metallic flange on said arm at the junction of said arm and said body, an insulating fiber terminal holder having a length considerably exceeding the width thereof and disposed externally of said coil in close proximity thereto and with said length dimension extending from one washer to the other, a slot in said terminal holder spaced approximately one-third the longitudinal distance from one end thereof, said insulating sheath passing through said hole in said insulating washer with said integral flange disposed adjacent the inner surface of said insulating washer, said integral metallic arm passing through said slot and being bent double on itself with said terminal holder therebetween, said wire ends on said coil being wrapped around and connected to said integral arm, and insulating tape wrapped around said coil covering same and said terminal holder, whereby said metallic body provides electrical connection to one end of said winding and whereby an external conductor may be inserted into said metallic body with said insulating sheath and metallic body deformed onto said external conductor for mechanical and electrical connection thereto.

13. An electric winding comprising, in combination, a core, a coil on said core having first and second wire ends, first and second relatively rigid square insulator washers on said core forming spool ends at each end of said winding, a hole in one corner in each of said insulator washers, first and second terminals each having an outer insulating sheath and an inner metallic tubular body, an integral arm on each said metallic body, an integral metallic flange on each said arm at the junction of said arm and said body, an insulating fiber terminal holder having a length considerably exceeding the width thereof and disposed externally of said coil in close proximity thereto and with said length dimension extending from one washer to the other, insulation between said terminal holder and the periphery of said coil, first and second slots in said terminal holder spaced approximately one-third the longitudinal distance from the two ends thereof, said insulating sheaths passing through said holes in said insulating washers with said integral flanges disposed adjacent the inner surfaces of said insulating washers, said integral metallic arms passing through the closest slots and being bent double on themselves with said terminal holder therebetween, said wire ends on said coil being wrapped around and connected to said integral arms, and insulating tape wrapped around said coil covering same and covering said terminal holder, whereby said metallic bodies provide electrical connection to the two ends of said winding and whereby external conductors may be inserted into said metallic bodies with said insulating sheath and metallic bodies deformed onto said external conductors for mechanical and electrical connection thereto.

References Cited in the file of this patent

UNITED STATES PATENTS

| | | |
|---|---|---|
| 2,501,686 | Merkle | Mar. 28, 1950 |
| 2,704,358 | Wells | Mar. 15, 1955 |
| 2,775,742 | Bogue et al. | Dec. 25, 1956 |
| 2,786,191 | Broske | Mar. 19, 1957 |
| 2,802,193 | Biba et al. | Aug. 6, 1957 |
| 2,992,370 | Laviana | July 11, 1961 |